Jan. 5, 1926.  
C. F. COWDREY  
1,568,803  
BRAKE TESTING DEVICE FOR AUTOMOBILES  
Filed June 21, 1924  
2 Sheets-Sheet 2
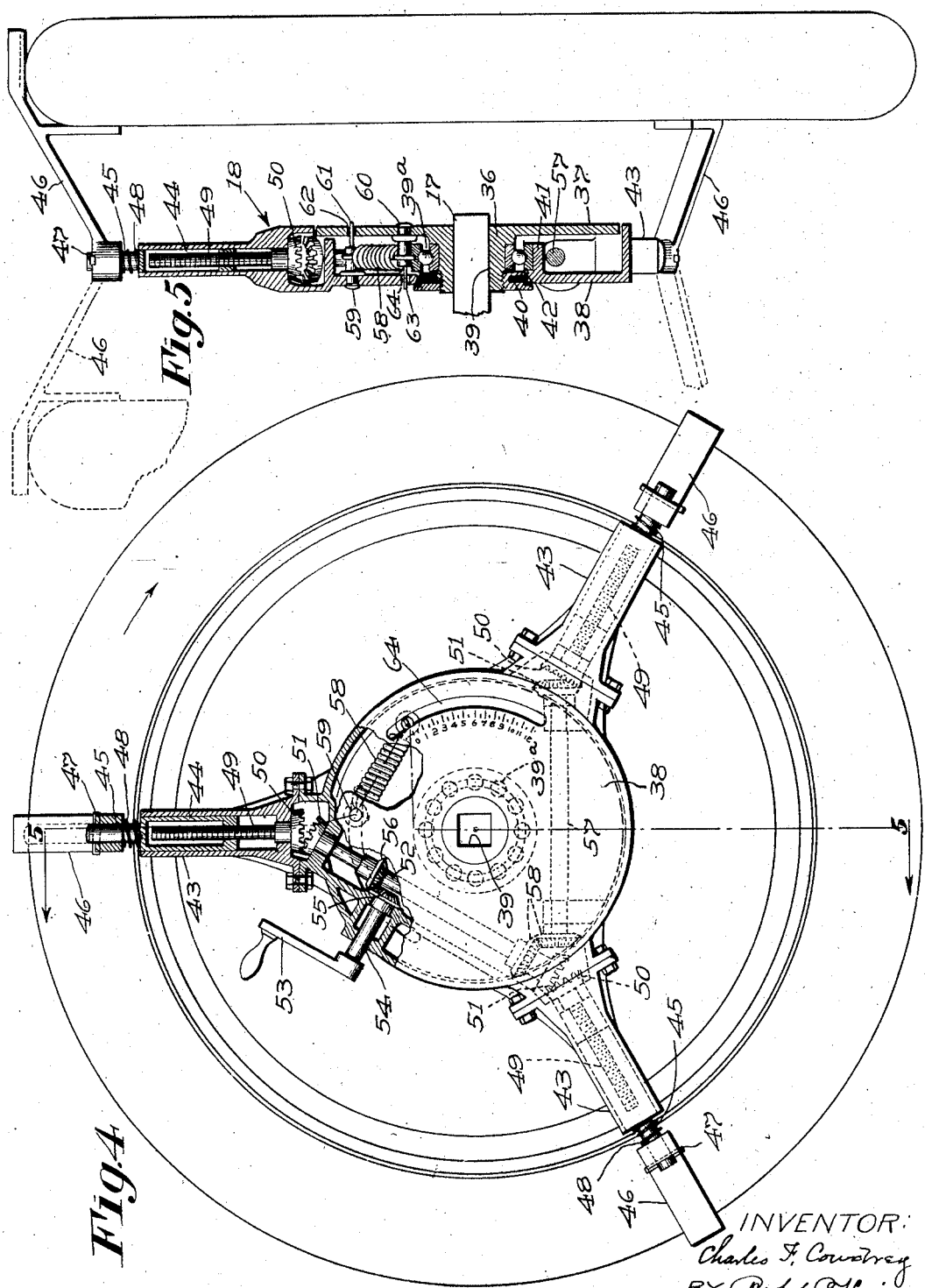
INVENTOR:  
Charles F. Cowdrey  
BY Robt. T. Hains  
ATTORNEY Patented Jan. 5, 1926.

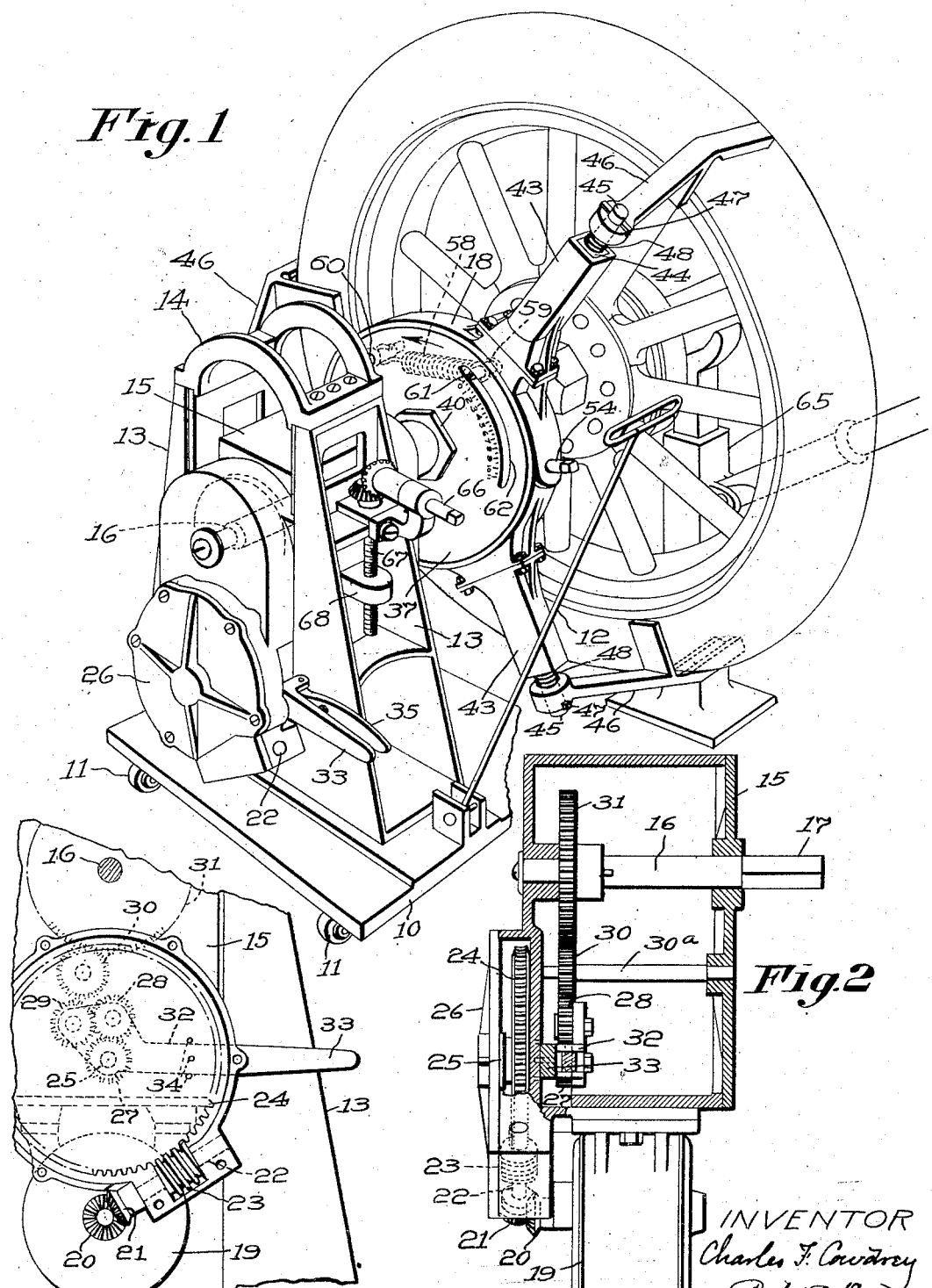

1,568,803

UNITED STATES PATENT OFFICE.

CHARLES F. COWDREY, OF FITCHBURG, MASSACHUSETTS.

BRAKE-TESTING DEVICE FOR AUTOMOBILES.

Application filed June 21, 1924. Serial No. 721,421.

*To all whom it may concern:*

Be it known that I, CHARLES F. COWDREY, a citizen of the United States, residing in Fitchburg, county of Worcester, and State of Massachusetts, have invented an Improvement in Brake-Testing Devices for Automobiles, of which the following description, in connection with the accompanying drawings, is a specification, like characters on the drawings representing like parts:

This invention relates to means for testing the action of the brakes upon the wheels of an automobile or other vehicle.

It is very important that the brakes of an automobile be at all times properly adjusted so that the brake bands upon the opposite wheels will act with equal or substantially equal force, because the speed of an automobile cannot be checked promptly unless each brake band acts with a substantial retarding force upon its wheel, and if one brake band exerts a greater retarding force than the brake band of the opposite wheel, the automobile itself is likely to swerve from its direct path of travel with dangerous result.

Many of the automobile accidents that now frequently occur are due to faulty brakes that fail to check the speed of the automobile promptly, or cause the automobile to swerve from its direct path. The improper adjustment of automobile brakes is due, to a large degree, to the lack of practical means for testing the action of the brakes upon the wheels of an automobile. When brakes are provided upon all four wheels of an automobile, the importance of maintaining the brakes properly adjusted becomes of still greater importance, for if the brakes upon the opposite front wheel operate with unequal retarding effect and the brakes upon the opposite rear wheel also act with unequal force, the tendency of the automobile to swerve from a direct path upon application of the brakes may be increased.

Heretofore it has been proposed to employ a lever or other operating means to turn an automobile wheel thru a small angle while the brake is applied, and to indicate the turning force applied to the wheel.

This proposed construction serves to indicate the force required to impart initial rotative movement to a wheel to turn it from a standing position; but does not indicate the true action of the brake band upon the wheel under actual running condition. In other words, the true action of a brake upon a continuously rotating wheel cannot be determined by merely indicating the force required to turn a wheel from a standing position thru a small angle.

Having the above matters in mind the present invention relates to a brake testing device that will correctly indicate the action of the brake upon a wheel under running conditions. In carrying out the present invention a head is provided that is adapted to be engaged with an automobile wheel to turn it thru successive revolutions under brake resistance, and the head is provided with means for indicating the turning force imparted to the wheel by the head.

After the action of a brake band upon one wheel has been tested and the reading of the indicator noted, the brake testing device is applied to the opposite wheel of the automobile and the action of the brake band upon this wheel is tested while the brake is applied the same as during the testing of the first wheel; and if a different reading is obtained in testing the second wheel the brake bands obviously need adjustment.

One feature of the present invention resides in a head consisting of relatively rotatable parts having yielding means for imparting the rotative movement from one part to the other, and in an indicator for indicating the relative movement of the parts while rotating a wheel.

Another feature of the present invention resides in arms upon said head which may be adjusted to extend from one face of the head to engage and rotate the wheel upon one side of an automobile, and adjusted to extend from the opposite face of the head when the latter is applied to the opposite wheel of the automobile.

Another feature of the invention resides in indicator means for indicating upon each face of the head the turning force applied to a wheel.

Other features of the invention and novel combination of parts in addition to the above will be hereinafter described in connection with the accompanying drawings which illustrate one good practical form thereof.

In the drawings—

Fig. 1 is a perspective view of a brake testing device constructed in accordance with the present invention and shown in position to test the brake of an automobile wheel.

Fig. 2 is an enlarged vertical sectional view thru the gear casing of Fig. 1.

Fig. 3 is an enlarged front view of part of the mechanism shown in Fig. 1, the gear cover plate being removed.

Fig. 4 is a face view of the head of the present invention shown applied to a wheel, parts of the head being shown in section; and Fig. 5 is a sectional view taken on the line 5—5 of Fig. 4.

In the embodiment of the invention illustrated, the brake testing device is shown as mounted upon a truck 10 provided with wheels or rollers 11 and the truck may be readily moved from one place to another by means of the handle 12. Upon the truck 10 is mounted a supporting frame consisting of the spaced upstanding columns 13 which are rigidly secured to the upper face of the truck 10 and the columns are connected at their upper ends by the bridge member 14. Between the spaced columns 13 is slidably mounted the gear casing 15, in which casing is rotatably mounted the main driving shaft 16 having an outwardly extending squared portion 17 adapted to engage and rotate the wheel operating head 18.

In the construction shown power means is provided for rotating the head 18 and to this end the main shaft 16 is driven thru a series of gears by an electric motor 19 which is conveniently secured to the lower face of the gear casing 15. The driving shaft of the electric motor 19 is provided with a bevel gear 20 which meshes with a bevel gear 21 secured to the worm shaft 22 mounted in a housing. A worm 23 upon the shaft 22 meshes with and drives the worm gear 24 rotatably mounted upon the shaft 25, and enclosed in a gear chamber provided with a cover plate 26. The worm gear 24 drives a pinion 27 mounted upon the shaft 25. It is desirable to reverse the direction of rotation of the main shaft 16 in testing wheels upon the opposite sides of an automobile, and in the present case reversing gears 28 and 29 are provided between the pinion 27 and the gear 30 supported by the shaft 30ª. The gear 30 meshes with and drives the gear 31 keyed to the main shaft 16. The reversing mechanism shown is of well known construction and the gears 28 and 29 are positioned so that the gear 28 meshes with and is driven by the pinion 27 and the gear 29 is driven by the gear 28. These two gears are mounted upon the lever 32, rockingly supported by the shaft 25, the forward end of which lever extends thru the gear casing to form the handle 33. When the handle is rocked downwardly the gear 29 is moved into driving engagement with the gear 30 to rotate the shaft 16 in one direction, and when the lever 32 is rocked upwardly the gear 28 is engaged with the gear 30 and the shaft 16 is rotated in the opposite direction. The lever 32 may be secured in either of the positions just mentioned, or in an intermediate position, by a pin adapted to enter in one of the holes 34 formed in an inner wall of the casing 15 and this pin is moved into and out of engagement with such hole by the pivoted operating handle 35. When the lever 32 is moved to its intermediate position, both gears 28 and 29 will be out of engagement with the gear 30.

The head 18, in the construction shown, consists of a hub portion 36 provided with an integral flange or disk portion 37, and rotatably mounted upon the hub 36 is a spider or wheel driving portion 38. The portions 37 and 38 are spaced apart, as shown in Fig. 5, to form a hollow chamber between them, in which gears and other parts to be described may be enclosed. The hub 36 of the head 18 is provided with a central opening 39 which is squared in cross section to conform to the squared end of the main shaft 16, the arrangement being such that the end 17 of this shaft may be inserted in the hub to support and rotate the same. An antifriction bearing 39ª is preferably provided between the hub portion 36 and the spider or wheel engaging portion 38 of the driving head, to reduce friction between these parts, when one rotates about the other. This antifriction bearing may be constructed as usual, and consists of an inner ring and an outer ring having a ball runway formed between them. The inner ring is mounted upon the hub 36 and is clamped in place thereupon by tightening up the nut 40 and the outer ring fits snugly within an annular flange 41 integral with the portion 38 of the head 18. The nut 40 is shown as provided with an annular groove in which a piece of felt 42 may be mounted to prevent dirt from entering the space between the nut and the adjacent surrounding wall.

In the construction shown, means is provided for clamping the head 18 to a wheel of an automobile, so that when the head is rotated by the main shaft 16 it will turn the wheel under brake resistance. Various means might be provided for imparting movement from the head 18 to the automobile wheel, and in the construction shown this is accomplished by providing the portion 38 of the head with three legs 43 which extend outwardly from the head portion 38 in a radial direction. The legs 43 are hollow and are shown as squared in cross section and within each leg is slidably mounted an elongated block 44, the outer end of which is provided with a stub shaft 45. Upon each stub shaft 45 is mounted a laterally extending tire-engaging arm 46 and the arms 46 are rotatably secured to the shafts 45 so that they may be rotated from the position shown in full lines in Fig. 5 to the position shown in dotted lines. It is desirable to provide means for maintaining the arms 46 in either of the positions shown in Fig. 5, and to this end the outer end portion of each stub shaft 45 is provided with a transversely extending pin 47 which pin is adapted to enter a notch formed across the hub of the arm 46 and the arm 46 is normally held in engagement with the pin 47 by a coiled spring 48 confined between the inner face of the hub of the arm 46 and the outer end of the sliding block 44. As a result of this construction the arm 46 may readily be rotated from the full line position in Fig. 5 to the dotted line position upon forcing it inward sufficiently to disengage the notch formed in the outer face of this lever from the pin 47.

It is desirable to provide means for moving the arms 46 inwardly simultaneously into clamping engagement with the tread of the automobile wheel so that the head 18 will be properly centered upon the wheel as the clamping arms 46 grip the wheel. To this end, in the construction shown, each sliding block 44 is threaded at its inner end to receive a threaded shaft 49 rotatably mounted within a leg 43. The inner end of each threaded shaft 49 is provided with a gear 50 which meshes with a driving gear 51. Two of the driving gears 51 are secured to the opposite ends of the shaft 52 rotatably mounted within the chamber formed between the portions 37 and 38 of the head 18. The shaft 52 may be manually rotated by means of a crank handle 53 which is removably secured to the stub shaft 54, the inner end of which shaft is provided with a bevel gear 55 that meshes with a bevel gear 56 secured to the shaft 52. A second shaft 57 mounted within the head 18 is driven from the shaft 52 by the cooperating bevel gears 58 and the third gear 51 is secured to and driven by the shaft 57. From the construction just described it will be seen that the adjusting threaded shafts 49 may be simultaneously rotated in one direction or the other by turning the crank handle 53.

As stated, the spider or wheel engaging portion 38 of the head is rotatably mounted upon the hub 36 and the hub 36 is mounted upon and driven by the main shaft 16. It is desirable to provide means for yieldingly imparting rotative movement from the hub portion 36 to the spider portion 38 and to this end, in the construction shown, a coiled spring 58 is provided, one end of which spring is secured to a transversely extending pin 59 rigidly secured to the spider portion 38, and the other end of this spring is secured to a transversely extending pin 60, rigidly secured to the flange portion 37 of the hub 36. As a result of the construction just described, when the brake testing device is applied to a wheel of an automobile, and the parts are driven by the motor 19 the hub 36 will rotate within the spider or wheel engaging portion 38 until sufficient tension is placed upon the spring 58 to turn the automobile wheel under brake resistance. It is essential that the force exerted to turn the wheel be indicated, and to this end, in the present construction, the pin 59 is provided with a pointer 61 that extends thru an arcuate slot 62 in the hub flange 37, and the pin 60 is provided with a pointer 63 which extends thru an arcuate slot 64 in the spider portion 38. Graduations are provided adjacent the arcuate slots 62 and 64, so that the extent to which the hub portion 36 rotates within the spider portion 38 may be readily noted by observing the position of the indicator upon either face of the head 18.

When the brake testing device of the present invention is applied to a wheel upon one side of an automobile, the main driving shaft 16 is driven in one direction, and when the brake testing device is applied to a wheel upon the opposite side of the automobile it is necessary to rotate this shaft in the opposite direction in order to rotate each automobile wheel in a forward direction. From the construction of the head 18 described it will be seen that the hub portion 36 must always be rotated by the main driving shaft in a direction to place the spring 58 under tension, but when the direction of the shaft 16 is reversed the rotative movement of this shaft is then in a direction to compress the spring 58 rather than tension it.

To overcome this difficulty the head 18 is constructed so that it may be readily removed from the shaft 16 after one wheel has been tested and then turned and inserted upon the shaft 16 with its opposite face towards the supporting frame 13. This necessitates shifting of the wheel engaging arms 46 from the position shown in full lines in Fig. 5 to the position shown in dotted lines in this figure. Upon observing Fig. 1 of the drawing it will be seen that the hub flange 37 faces outwardly from the automobile wheel and upon observing Figs. 4 and 5 it will be seen that the head 18 has been turned around so that the spider portion 38 faces outwardly from the automobile wheel. Since an indicator and cooperating scale is provided upon each face of the head 18 the reading during the testing of a wheel may be readily noted, irrespective of which face of the head 18 is exposed.

In testing the brake action upon the opposite wheels of an automobile, the depression of the foot brake pedal should be maintained the same thruout the entire operation, and after the force required to turn one wheel under brake resistance has been determined by the present device the brake tester is moved to the opposite wheel to determine the force required to turn this wheel under brake resistance, and if the reading obtained during the testing of the two wheels differs substantially, adjustment of the brake bands is obviously needed.

Since automobile wheels differ in size, it is desirable to provide means for raising and lowering the main driving shaft 16 so that this shaft may be readily alined with the axis of the wheel being tested.

To this end the gear casing 15 is slidably mounted between the spaced columns 13, as above stated, and the entire casing 15 may be readily raised or lowered by applying the crank handle 53 to the horizontally extending shaft 66 rotatably mounted upon one of the uprights 13, and the inner end of this shaft is provided with a bevel gear which meshes with and drives a bevel gear secured to the upper end of the threaded shaft 67, which shaft extends thru a threaded hole in a lug 68 formed upon one wall of the casing 15.

What is claimed is:—

1. A brake tester for testing the action of a brake upon a wheel of an automobile, comprising in combination, a head engageable with a wheel of an automobile to rotate the wheel under brake resistance and consisting of a hub portion and a wheel engaging portion rotatable upon the hub portion, means for rotating the hub portion and operable to turn an automobile wheel when the brake is applied hard, a spring for yieldingly imparting the rotative movement of the hub portion to the wheel engaging portion, and an indicator actuated by the movement of one of said portions relative to the other to indicate the rotative force applied to the wheel.

2. A brake tester for testing the action of a brake upon a wheel of an automobile, comprising in combination, a head engageable with a wheel of an automobile to rotate about the wheel axis and constructed to turn the wheel under pronounced brake resistance, driving means for rotating said head to turn the wheel, a support for the driving means which does not rotate with the wheel, means upon the head adapted to yield in response to the turning force exerted upon the wheel, and means operable by the yielding movement for indicating the force exerted to turn the wheel.

3. A brake tester for testing the action of a brake upon a wheel of an automobile, comprising in combination, a head engageable with a wheel of an automobile to rotate with the wheel thru successive revolutions to turn the wheel under brake resistance, means for rotating said head to turn the wheel under strong brake resistance, a support for the rotating means and relatively to which the wheel rotates, and an indicator upon the head for indicating the rotative force applied to the wheel.

4. A brake tester for testing the action of a brake upon a wheel of an automobile, comprising in combination, a head engageable with a wheel of an automobile to rotate with the wheel through successive revolutions to turn the wheel under brake resistance, power actuated means for rotating said head to turn the wheel, and an indicator upon the head for indicating the rotative force applied to the wheel.

5. A brake tester for testing the action of a brake upon a wheel of an automobile, comprising in combination, a supporting frame having a shaft, a head upon said shaft and engageable with a wheel of an automobile to rotate the wheel under brake resistance, means for rotating said head, and an indicator upon the head for indicating the rotative force applied to the wheel.

6. A brake tester for testing the action of a brake upon a wheel of an automobile, comprising in combination, a head adapted to be engaged with a wheel of an automobile to rotate the wheel continuously thru successive revolutions under brake resistance, means to rotate the head to turn the wheel, a support for the rotating means and relatively to which the wheel rotates thru successive revolutions, and indicating means upon the head for indicating the turning force applied to the wheel.

7. A brake tester for testing the action of a brake upon a wheel of an automobile, comprising in combination, a head having laterally extending arms adjustable into gripping engagement with the tread of an automobile wheel to turn the wheel thru successive revolutions, means for forcing the arms into gripping engagement with the tread, means for rotating the head to turn the wheel under brake resistance, and means upon the head for indicating the rotative force applied to the wheel.

8. A brake tester for testing the action of a brake upon a wheel of an automobile, comprising in combination, a head for rotating a wheel of an automobile under brake resistance and consisting of a hub portion and a wheel engaging portion rotatable upon the hub portion and having projecting wheel engaging parts, means for rotating said hub portion, yielding means for imparating rotative force from the hub portion to the wheel engaging portion, and means for indicating the force applied to the wheel.

9. A brake tester for testing the action of a brake upon a wheel of an automobile, comprising in combination, a head for rotating a wheel of an automobile under brake resistance and consisting of a hub portion and a wheel engaging portion rotatable upon the hub portion, means for rotating said hub portion, yielding means for imparting rotative force from the hub portion to the wheel engaging portion and constructed to turn the wheel under strong brake resistance, and means positioned by the rotation of one of said portions relative to the other to indicate the force applied to the wheel.

10. A brake tester for testing the action of a brake upon a wheel of an automobile, comprising in combination, a head having laterally extending arms engageable with the tread of an automobile wheel, means for moving the arms simultaneously upon the head into wheel gripping position, means for rotating the head to rotate the wheel under brake resistance, and means upon the head for indicating the rotative force applied to the wheel by the head.

11. A brake tester for testing the action of a brake upon a wheel of an automobile, comprising in combination, a head for rotating an automobile wheel under brake resistance, consisting of a hub portion and a wheel engaging portion rotatively mounted upon the hub portion, an anti-friction bearing between said portions, means for rotating the hub portion, yielding means for imparting the rotative movement of the hub portion to the wheel engaging portion, and means for indicating the rotative force imparted from the former portion to the latter.

12. A brake tester for testing the action of the brake bands upon the wheels of an automobile, comprising in combination, a supporting stand having a rotating shaft, a wheel engaging head removably mounted on said shaft and adapted to be positioned upon the shaft with either face toward the automobile wheel it rotates, means for rotating the head to turn the wheel, and means for indicating the turning force applied to the wheel.

13. A brake tester for testing the action of the brake bands upon the wheels of an automobile, comprising in combination, a head engageable with a wheel of an automobile to rotate the wheel under brake resistance, means for securing the head to the wheel with either face toward the wheel, means for rotating the head and means for indicating the turning force applied to the wheel.

14. A brake tester for testing the action of the brake bands upon the wheels of an automobile, comprising in combination, a head engageable with a wheel of an automobile to rotate the wheel under brake resistance, means for securing the head to the wheel with either face toward the wheel, means for rotating the head, and indicating means upon each face of the head for indicating the turning force applied to the wheel.

15. A brake tester for testing the action of the brake bands upon the wheels of an automobile, comprising in combination, a head for rotating a wheel of an automobile under brake resistance, arms upon said head and adjustable to extend outwardly from either face of the head into engagement with an automobile wheel, means for rotating the head to turn the automobile wheel, and means for indicating the turning force applied to the wheel.

16. A brake tester for testing the action of the brake bands upon the wheels of an automobile, comprising in combination, a head for rotating a wheel of an automobile under brake resistance consisting of relatively rotating parts connected by yielding means, means for rotating one of said parts, arms upon said other part and adjustable to extend from one face of the head to rotate a wheel upon one side of the automobile and adjustable to extend from the opposite face of the head to rotate a wheel upon the other side of the automobile, and means for indicating the turning force applied to a wheel.

17. A brake tester for testing the action of a brake upon a wheel of an automobile, comprising in combination, a head engageable with a wheel of an automobile to rotate the wheel under brake resistance, means for rotating the head, and means for indicating upon the opposite faces of the head the turning force applied to the wheel.

18. A brake tester for testing the action of a brake upon a wheel of an automobile, comprising in combination, a head engageable with a wheel of an automobile to rotate the wheel under brake resistance and consisting of relatively rotating parts provided with yielding means for imparting movement from one to the other, means for rotating the head, and means for indicating upon the opposite faces of the head the relative movement of said parts during rotation of the automobile wheel.

19. A brake tester for testing the action of a brake upon a wheel of an automobile, comprising in combination, a head for rotating a wheel of an automobile under brake resistance and consisting of relatively movable parts provided with yielding means for imparting rotative movement from one part to the other, means for driving one of said parts, means upon the other part engageable with an automobile wheel, and means for indicating the relative movement of said parts during the rotation of the automobile wheel.

In testimony whereof, I have signed my name to this specification.

CHARLES F. COWDREY.